United States Patent
Zhou et al.

(10) Patent No.: US 8,570,885 B2
(45) Date of Patent: Oct. 29, 2013

(54) UPLINK FEEDBACK IN A MULTIMEDIA BROADCAST/MULTICAST SERVICES (MBMS) WIRELESS COMMUNICATIONS SYSTEM

(75) Inventors: Qi Zhou, Shanghai (CN); Dan Shang, Shanghai (CN)

(73) Assignee: NXP, B.V., Eindhoven (NL)

( * ) Notice: Subject to any disclaimer, the term of this patent is extended or adjusted under 35 U.S.C. 154(b) by 326 days.

(21) Appl. No.: 12/918,158

(22) PCT Filed: Feb. 18, 2009

(86) PCT No.: PCT/IB2009/050670
§ 371 (c)(1),
(2), (4) Date: Aug. 18, 2010

(87) PCT Pub. No.: WO2009/104146
PCT Pub. Date: Aug. 27, 2009

(65) Prior Publication Data
US 2010/0322102 A1    Dec. 23, 2010

Related U.S. Application Data

(60) Provisional application No. 61/029,911, filed on Feb. 19, 2008.

(51) Int. Cl.
*G01R 31/08* (2006.01)
*H04J 1/16* (2006.01)

(52) U.S. Cl.
USPC .......................................... 370/252; 370/241

(58) Field of Classification Search
USPC ................................ 370/252, 241
See application file for complete search history.

(56) References Cited

U.S. PATENT DOCUMENTS 7,979,075 B2 *  7/2011  Cheng et al. .................. 455/450
2003/0134655 A1  7/2003  Chen et al.
(Continued)

FOREIGN PATENT DOCUMENTS

EP         1998577 A1   12/2008
WO     2005091541 A2    9/2005
(Continued)

OTHER PUBLICATIONS

Pedersen, Klaus I., et al; "Frequency Domain Scheduling for OFDMA With Limited and Noisy Channel Feedback"; Vehicular Technology Conference, 2007 IEEE 66$^{th}$; PI; p. 1792-1796; (Sep. 1, 2007).

(Continued)

*Primary Examiner* — Mark Rinehart
*Assistant Examiner* — Angel Brockman (57) ABSTRACT

A technique for managing uplink feedback involves establishing a channel quality threshold range, for example, in terms of a channel quality indicator (CQI), broadcasting the channel quality threshold range to the mobile stations and using the channel quality threshold range to control the feedback of channel quality information. For example, the mobile stations determine their own mobile station-specific CQI and then generate CQI feedback information in response to a comparison between their own mobile station-specific CQI and the CQI threshold range. In an embodiment, if the CQI of a mobile station falls within the CQI threshold range, then the mobile station can transmit a reduced set of CQI feedback information. For example, the reduced set of CQI feedback information may be a single bit that indicates whether the mobile station-specific CQI is greater than or less than a CQI threshold or whether the CQI has crossed a CQI threshold.

20 Claims, 7 Drawing Sheets

(56) References Cited

U.S. PATENT DOCUMENTS

2005/0143084 A1 6/2005 Cheng et al.
2005/0201296 A1* 9/2005 Vannithamby et al. ....... 370/241
2006/0072508 A1 4/2006 Zou et al.
2007/0070956 A1* 3/2007 Seki .............................. 370/335

FOREIGN PATENT DOCUMENTS

WO 2007/111185 A1 10/2007
WO 2008/018039 A2 2/2008

OTHER PUBLICATIONS

Yang, Lin, et al; "Further Results on Selective Multiuser Diversity"; Intl Workshop on Modeling Analysis and Simulation of Wireless and Mobile; Proceedings of the 7$^{th}$ ACM International Symposium on Modeling, Analysis and Simulation of Wireless and Mobilesystems, Oct. 4-6, 2004, Venezia, Italy, pp. 25-30 (2004).

Wu, Xiaoxin, et al; Low Overhead CQI Feedback in Multi-Carrier Sytems; Global Telecommunications Conference; IEEE Publication; pp. 371-375; (Nov. 26-30, 2007).

Vartiainen, Vukke, et al; "Point-To-Multipoint Multidedia Broadcast Multicast Service (MBMS) Performance Over HSDPA"; IEEE 18$^{th}$ Intl Symposium on Personal, Indoor and Mobile Radio Communications 2007; (Sep. 3-7, 2007).

Parkvall, Stefan et al; "Evolving 3G Mobile Systems: Broadband and Broadcast Services in WEDMA"; Communications Magazine, IEEE, vol. 44, No. 2; p. 68-74; (Feb. 2006).

3GPP TR 25.814 V7.1.0; "Physical Layer Aspects for Evolved Universal Terrestrial Radio Access (UTRA)"; Release 7 ; Sep. 2006.

Jeon, Soo-Yong, et al; "Channel Adaptive CQI Reporting Schemes for HSDPA Systems"; Communications Leters; IEEE vol. 10, Issue 6; pp. 459-461; (Jun. 6, 2006).

R1-074501; "Summary of CQI Ad Hoc"; 3GPP RAN WG1#50BIS; (Oct. 8-12, 2007).

R1-074694; "All Sub-Band and Differential CQI Feedback for E-UTRA"; Texas Instruments; 3GPP RAN WG1#51 (Nov. 5-9, 2007).

3GPP TS 36.300 V8.20; "Evolved Universal Terrestrial Radio Access (E-UTRA) and Evolved Universal Terrestrial Radio Access Network (E-UTRAN); Overall Description", Stage 2; Sep. 2007.

R1-074325; "MBMS Single-Cell P-T-M Related Control Signalling"; Nokia Siemens Networks; 3GPP RAN WG1 #50BIS; (Oct. 8-12, 2007).

R2-075049; "Conditional HARQ Retransmission for Single Cell MBMS and Text Proposal"; Alctel-Lucent; 3GPP RAN WG2#60; (Nov. 5-9, 2007).

R2-073361; "Channel Quality Reporting for LTE MBMS"; LG Electronics; 3GPP RAN WG2#59; (Aug. 20-24, 2007).

R1-072710; "Uplink Feedback for E-MBMS"; Motoroal; 3GPP RAN WG1#49IBS (Jun. 25-29, 2007).

R2-074927; "MBMS Feedback Configuration"; Nokia-Siemens Networks, Nokia; 3GPP RAN WG2#60; (Nov. 5-9, 2007).

International Search Report for Application PCT/IB2009/050670 (Feb. 18, 2009).

* cited by examiner

UPLINK FEEDBACK IN A MULTIMEDIA BROADCAST/MULTICAST SERVICES (MBMS) WIRELESS COMMUNICATIONS SYSTEM

The invention relates generally to wireless communications systems, and more particularly, to techniques for managing uplink feedback in a multimedia broadcast/multicast services (MBMS) wireless communications system.

Multimedia Broadcast Multicast Services (MBMS) is a broadcasting service that can be supported in wireless communications systems, such as Global System for Mobile (GSM) Communications and Universal Mobile Telecommunications System (UMTS) wireless communications system. In MBMS, multiple mobile stations simultaneously receive the same content via downlink transmissions from a base station. MBMS also provides for uplink communications from the mobile stations to the base station, including uplink feedback signaling. Uplink feedback signaling includes Hybrid Automatic Repeat-Request (HARM), which is used to ensure reliable transport via acknowledgement (ACK) and negative acknowledgement (NACK) signals, and channel quality information, which is used to indicate the downlink channel quality.

Because MBMS is a broadcast service, it is expected that there can be multiple mobile stations within the service area of a base station at any one time. In order to optimize the downlink channel quality for the mobile stations that are within range of the base station, it is desirable to receive downlink channel quality information from the mobile stations. While it may be beneficial for the base station to have a full set of channel quality information from each mobile station that is within its range, uplink bandwidth is a limited resource that needs to be used efficiently. Although some techniques exist for controlling the feedback of channel quality information from the mobile stations to the base station, there is still a need for an uplink feedback scheme that provides the base station with a rich set of channel quality information in a bandwidth efficient manner.

A technique for managing uplink feedback in accordance with an embodiment of the invention involves establishing a channel quality threshold range, for example, in terms of a channel quality indicator (CQI), broadcasting the channel quality threshold range to the mobile stations and using the channel quality threshold range to control the feedback of channel quality information from the mobile stations to the base station. For example, the mobile stations determine their own mobile station-specific CQI and then generate CQI feedback information in response to a comparison between their own mobile station-specific CQI and the CQI threshold range. In an embodiment, if the CQI of a mobile station falls within the CQI threshold range, then the mobile station can transmit a reduced set of CQI feedback information. For example, the reduced set of CQI feedback information may be a single bit that indicates whether the mobile station-specific CQI is greater than or less than a CQI threshold. In another embodiment, the reduced set of CQI feedback information may be a single bit that indicates the mobile station-specific CQI has crossed a CQI threshold that lies within the CQI threshold range. On the other hand, if the CQI of a mobile station falls outside of the CQI threshold range, then the mobile station will transmit a full set of CQI feedback information to the base station. In some cases, the outcome of the CQI comparison is combined with retransmission information (e.g., ACK/NACK) to determine whether or not a reduced set of CQI feedback information should be transmitted.

Other aspects and advantages of the present invention will become apparent from the following detailed description, taken in conjunction with the accompanying drawings, illustrating by way of example the principles of the invention.

Throughout the description, similar reference numbers may be used to identify similar elements.

Figure 1:
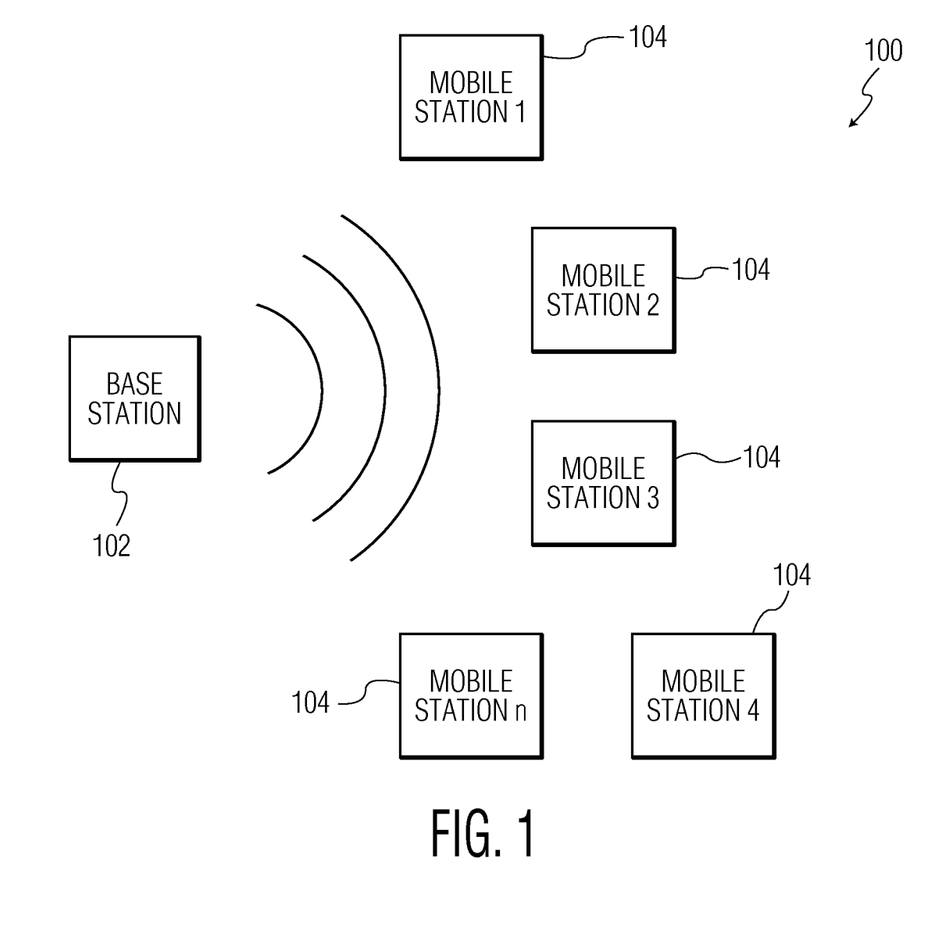
FIG. 1 illustrates a wireless communications network that includes a base station and multiple mobile stations.

FIG. 1 illustrates a wireless communications network 100 that includes a base station 102 and multiple mobile stations 104. The wireless communications network supports MBMS in which content is broadcast simultaneously to the mobile stations from the base station. The base station and mobile stations support wireless communications systems such as GSM and UMTS wireless communications systems. As is known in the field, the base station may alternatively be referred to as an evolved node B (eNB) and the mobile stations may alternatively be referred to as user equipments (UEs). Typically, the mobile stations are wireless handsets.

In the wireless communications system 100 of FIG. 1, uplink feedback channels are allocated to allow the mobile stations 104 to provide channel quality information (e.g., as a channel quality indicator (CQI)) and retransmission information (e.g., as an acknowledgement (ACK) or a negative acknowledgement (NACK)) to the base station 102. With respect to channel quality information, the base station uses the channel quality information to adjust the modulation and coding scheme (MCS) to best fit the current transmission conditions, e.g., propagation conditions, multipath fading, number and distribution of mobile stations, etc. For example, the base station tries to maximize the spectral efficiency while still meeting any quality of service (QoS) requirements. Determining the ideal MCS is a very dynamic task because channel quality information tends to vary with mobile station movement and changing propagation conditions.

A technique for managing uplink feedback in accordance with an embodiment of the invention involves establishing a channel quality threshold range, for example, in terms of a CQI, broadcasting the channel quality threshold range to the mobile stations 104 and using the channel quality threshold range to control the feedback of channel quality information from the mobile stations to the base station 102. For example, the mobile stations determine their own mobile station-specific CQI and then generate CQI feedback information in response to a comparison between their own mobile station-specific CQI and the CQI threshold range. In an embodiment, if the CQI of a mobile station falls within the CQI threshold range, then the mobile station can transmit a reduced set of CQI feedback information. For example, the reduced set of CQI feedback information may be a single bit that indicates whether the mobile station-specific CQI is greater than or less than a CQI threshold. In another embodiment, the reduced set of CQI feedback information may be a single bit that indicates the mobile station-specific CQI has crossed a CQI threshold that lies within the CQI threshold range. On the other hand, if the CQI of a mobile station falls outside of the CQI threshold range, then the mobile station will transmit a full set of CQI feedback information to the base station. In some cases, the outcome of the CQI comparison is combined with retransmission information (e.g., ACK/NACK) to determine whether or not a reduced set of CQI feedback information should be transmitted.

The base station 102 uses all of the CQI feedback information, including the reduced sets and full sets of CQI feedback information to select a modulation and coding scheme. Additionally, the CQI threshold range can be dynamically adjusted to adapt to changing conditions of the MBMS wireless communications system. In an embodiment, the CQI threshold range is adjusted to include as many mobile stations 104 as possible within the CQI threshold range so that the volume of CQI feedback information being sent in the uplink direction is kept to a minimum. That is, the CQI threshold range is adjusted so that as many of the mobile stations as possible are reporting a reduced set of CQI feedback information while the base station still receives a useful set of CQI feedback information.

In a wireless communications system, channel quality information is often reported as a CQI. A CQI is a measurement of the communication quality of wireless channels. The CQI can be a value (or values) representing a measure of channel quality for a given channel. Typically, a high CQI is indicative of a channel with high quality and a low CQI is indicative of a channel with low channel quality. A CQI for a channel can be calculated as a function of, for example, a signal-to-noise ratio (SNR), a signal-to-interference plus noise ratio (SINR), a signal-to-noise plus distortion ratio (SNDR). These values and others can be measured for a given channel and then used to compute a CQI for the channel. The CQI for a given channel can be dependent upon the modulation and coding scheme. For example, a wireless communications system that uses code-division multiple access (CDMA) can make use of a different CQI than a communications system that makes use of orthogonal frequency division multiplexing (OFDM). In more complex wireless communications systems, such as those making use of multiple-input multiple output (MIMO) and space-time coded systems, the CQI used can also be dependent on receiver type. Other factors that may be taken into account in CQI are performance impairments, such as Doppler shift, channel estimation error, interference, and so forth. According to the $3^{rd}$ Generation Partnership Project (3GPP) Long Term Evolution (LTE) wireless communications protocol, a full set of CQI information is reported as a thirty-two bit index.

Figure 2:
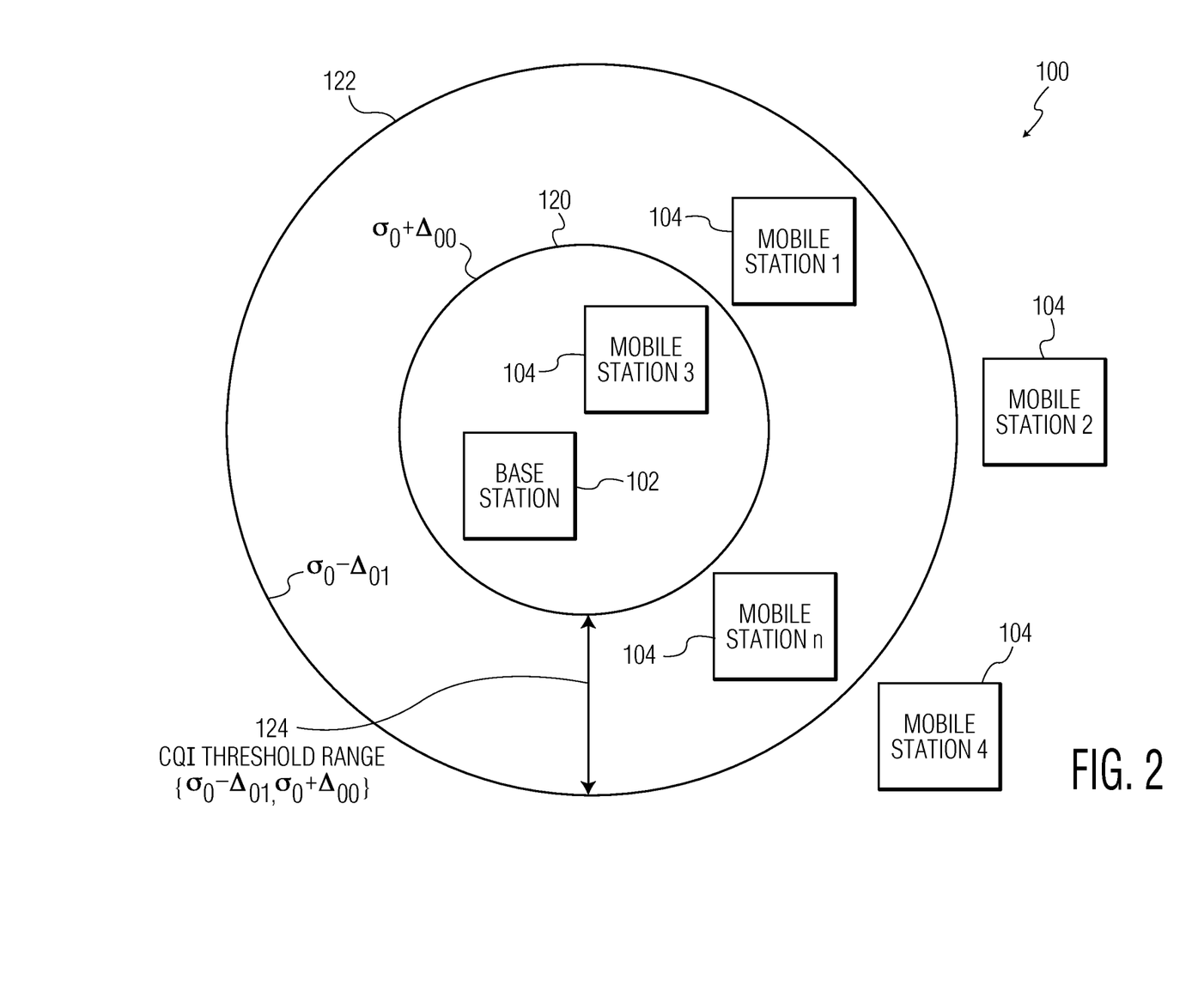
FIG. 2 illustrates the boundaries of a CQI threshold range relative to the base station and the mobile stations of the wireless communications system from FIG. 1.

FIG. 2 illustrates the boundaries of a CQI threshold range relative to the base station 102 and the mobile stations 104 of the wireless communications system 100 from FIG. 1. In particular, FIG. 2 depicts an upper boundary 120 and a lower boundary 122, which together form a CQI threshold range 124. The upper boundary 120 represents the maximum CQI of the CQI threshold range and the lower boundary 122 represents the minimum CQI of the CQI threshold range. Mobile stations that have a CQI greater than the magnitude of the upper boundary fall outside the upper boundary 120 of the CQI threshold range, mobile stations that have a CQI less than the magnitude of the lower boundary fall outside the lower boundary 122 of the CQI threshold range, and mobile stations that have a CQI that is between the upper and lower boundaries of the CQI threshold range fall within the CQI threshold range. In FIG. 1, mobile stations 1, 2, and n are inside the CQI threshold range, mobile station 3 is outside the upper boundary of the CQI threshold range, and mobile station 4 is outside the lower boundary of the CQI threshold range. It should be noted that the upper and lower boundaries of the CQI threshold range correspond to channel quality information and although the upper and lower boundaries of the CQI threshold range may correspond to physical distances of the mobile station from the base station, it is not necessarily the case.

Figure 3:
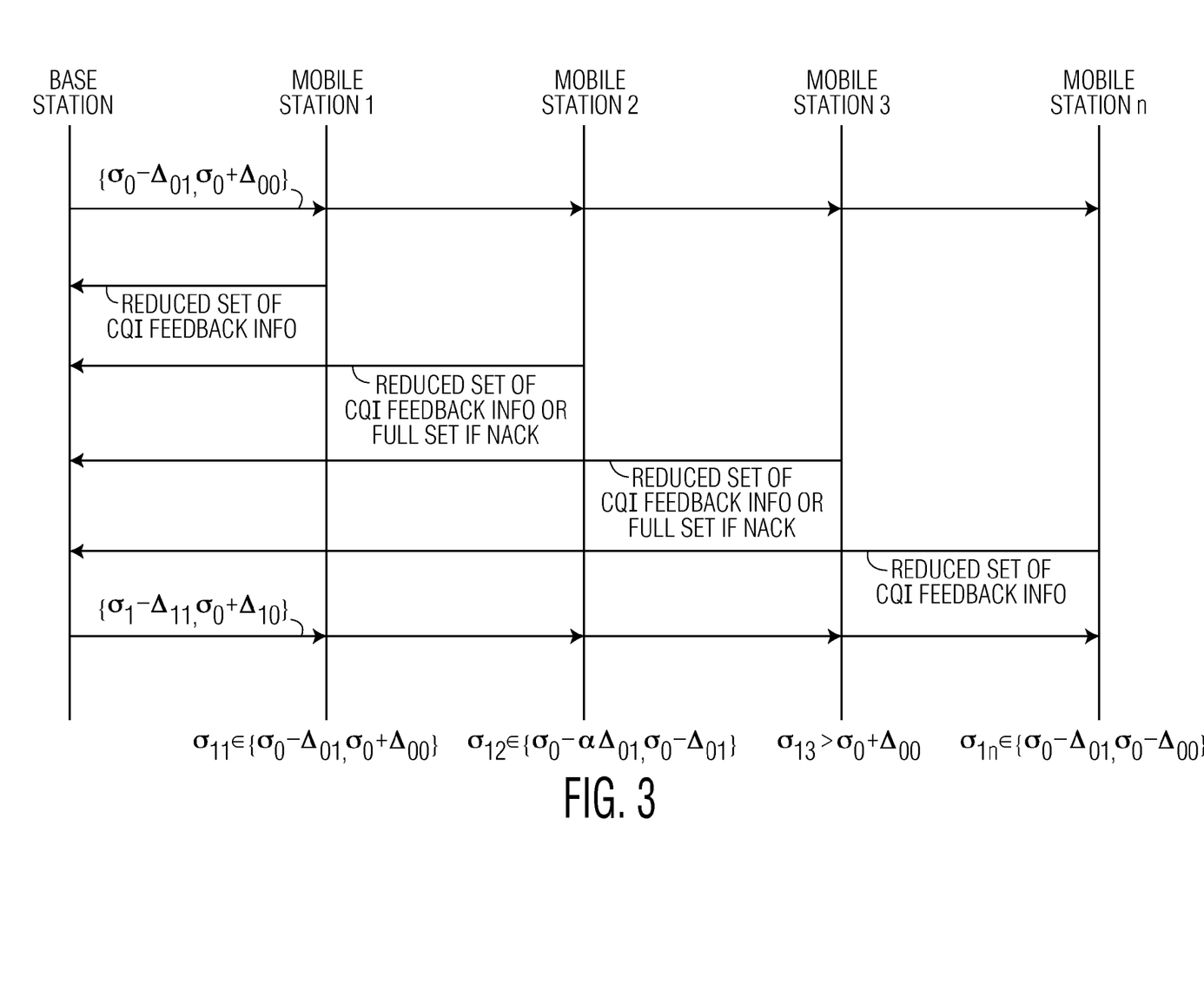
FIG. 3 illustrates uplink and downlink signaling between the base station and the mobile stations of FIG. 2.

An example of a technique for controlling the feedback of downlink channel quality information is now described in more detail with reference to FIGS. 2 and 3. While FIG. 2 illustrates the boundaries of a CQI threshold range, FIG. 3 illustrates uplink and downlink signaling between the base station 102 and the mobile stations 104. According to the technique, the base station 102 first establishes an initial CQI threshold range. In an embodiment, the base station establishes the initial CQI threshold range by setting an initial CQI threshold and by setting upper and lower boundaries that are defined as offset values from the CQI threshold. For example, the base station establishes a CQI threshold as $\sigma_0$, the upper boundary as $\sigma_0 + \Delta_{00}$, and the lower boundary as $\sigma_0 + \Delta_{01}$, where $\Delta_{00}$ and $\Delta_{01}$ are the upper and lower boundary offset values, respectively, such that the CQI threshold range can be expressed as $\{\sigma_0 - \Delta_{01}, \sigma_0 + \Delta_{00}\}$. Different techniques for establishing the initial CQI threshold range are described below. Briefly, in one embodiment, the initial CQI threshold range is set to collect a full set of CQI feedback information from all or nearly all of the mobile stations that are utilizing the MBMS service and in another embodiment, the initial CQI threshold range is roughly estimated to collect a reduced set of CQI feedback information from a predetermined of the mobile stations and a full set of CQI feedback information from the rest of the mobile stations.

Once an initial CQI threshold range is established, the base station 102 broadcasts the CQI threshold range to the mobile stations 104. FIG. 3 illustrates the broadcast of a CQI threshold range to the mobile stations. The base station may also broadcast other MBMS content that can be used by the mobile stations to generate channel quality information, for example, in the form of a CQI. The mobile stations receive MBMS content and the CQI threshold range from the base station and in response, each mobile station evaluates the downlink channel quality and generates downlink channel quality information, e.g., in the form of a CQI. The CQI generated from each specific mobile station is identified herein as $\sigma_{1i}$, (i=n), where n equals the number of mobile stations receiving the MBMS content. At each mobile station, the mobile station-specific CQI is compared to the CQI threshold range and CQI feedback information is generated, as described below, in response to the comparison.

If the mobile station-specific CQI of a mobile station falls within the CQI threshold range, i.e., $\sigma_{1i} 0 \{\sigma_0 - \Delta_{01}, \sigma_{01} + \Delta_{00}\}$, then in an embodiment, a reduced set of CQI feedback information is provided to the base station. In an embodiment, a reduced set of CQI feedback information is an indication of the magnitude of the mobile station-specific CQI relative to the CQI threshold. For example, the CQI feedback information is simply an indication of whether the mobile station-specific CQI is greater than or less than the CQI threshold. In an embodiment, only one bit of relative information is needed, e.g., a "0" bit to indicate that the mobile station-specific CQI is less than the CQI threshold and a "1" bit to indicate that the mobile station-specific CQI is greater than the CQI threshold. In an alternative embodiment, the CQI feedback information is an indication that the mobile station-specific CQI has crossed the CQI threshold. For example, only one bit is needed to indicate that the mobile station-specific CQI has crossed the threshold. When the CQI feedback information is simply an indication of a threshold crossing, the mobile stations can be configured to transmit the reduced set of CQI feedback information only upon a threshold crossing. This further reduces the volume of CQI feedback information while still providing the mobile station with useful CQI feedback information.

Referring to FIGS. 2 and 3, the CQIs of mobile station 1 and mobile station n fall within the CQI threshold range and therefore these mobile stations return a reduced set of CQI feedback information. For example, mobile stations 1 and n return one bit that indicates whether their CQI is greater than or less than the CQI threshold. Note that the higher the CQI value, the better the channel link quality is. The number of mobile stations returning a "0" as CQI feedback information is referred to herein as A(1) and the number of mobile stations returning a "1" as CQI information is referred to herein as B(1).

If the mobile station-specific CQI of a mobile station falls within a certain range of the lower boundary, for example, expressed as $\sigma_{1i} \in \{\sigma_0 - \alpha_1 \Delta_{01}, \sigma_0 - \Delta_{01}\}$, where $$\alpha_1 \in \left\{ \left\lfloor \frac{\sigma_0}{\Delta_{01}} \right\rfloor, 1 \right\},$$

then the mobile station generates a full set of channel quality information only if the mobile station erroneously received the current MBMS content, e.g., if the mobile station has generated a NACK to indicate that data is missing at the receiving end. In FIG. 3, mobile station 2 falls within this category and returns a full set of CQI feedback information. The number of mobile stations falling into this category is referred to herein as C(1). A feedback probability factor can be introduced to further control the uplink signaling together with the help of $\alpha_1$. For example, a probability factor of 0.75 can be implemented to cause only 75% of the mobile stations in this category to return a full set of CQI feedback information. The probability factor can be adjusted as needed to control the number of mobile stations that are returning a full set of CQI feedback information to the base station.

If the mobile station-specific CQI of a mobile station is greater than the upper boundary, for example, expressed as $\sigma_{1i} > \sigma_0 + \Delta_{00}$, but the mobile station has erroneously received the current MBMS content, e.g., the mobile station has generated a NACK to indicate that data is missing at the receiving end, then the mobile station generates a full set of CQI information. In FIG. 3, mobile station 3 falls in this category. However, if the mobile station-specific CQI of the mobile station is greater than the upper boundary and the mobile station has correctly received the current MBMS content, e.g., the mobile station has generated an ACK to indicate that all data has been correctly received, then a reduced set of CQI information is generated and transmitted to the base station.

Using the CQI feedback information provided to the base station 102 from the mobile stations 104, the base station can adjust the CQI threshold range, including the CQI threshold and/or the upper and/or lower offsets to adapt to current conditions. Different techniques can be used to generate a new CQI threshold range. In an embodiment, calculations of a new CQI threshold range are a function of $\{n, A(1), B(1), C(1), \sigma_0, \Delta_{00}, \Delta_{01}, \sigma_{1i}$ (i.e., any full sets of CQI feedback information that are received)$\}$. In an embodiment, the offset values for the upper and/or lower boundaries can be adjusted according to a probability distribution of collected uplink CQI information. In principle, the updated threshold range should statistically reflect most of the active mobile stations' CQI information.

Using the above-described technique, updated CQI threshold ranges are derived from a balanced consideration of the CQI values from the mobile stations. Theoretically, the CQI threshold will change smoothly instead of abruptly. The technique better embodies overall transmission adjustment by taking into account multiple mobile stations' CQI. Meanwhile, the feedback mechanism guarantees diversified CQI values being most efficiently reported in the uplink control signaling channel.

In an embodiment, it is enough for the mobile stations to report CQI feedback information only when the mobile station-specific CQI of a mobile station has crossed the CQI threshold, and so the CQI threshold range is set to include the broadest range defined in the particular wireless communications specification, e.g., the 3GPP LTE wireless communications protocol. Therefore, there is no need to select a portion of the mobile stations to report full CQIs to adjust the CQI threshold.

When A(1)+C(1) is greater than B(1), it is an indication that the individual channel condition is decreasing for most of the mobile stations. In this case, it may help to further reduce the uplink signaling overhead without impacting the next round statistical estimation of the CQI threshold.

Various different techniques can be used to establish the initial CQI threshold range. According to a first technique, the offset values can be set so that the CQI threshold range includes all mobile stations that are within range of the base station. All mobile stations within the CQI threshold range generate a full set of channel quality information, e.g., a thirty-two bit CQI as specified in 3GPP LTE. This approach allows the base station to receive all possible CQI information. The base station can then use all of the CQI information to determine a CQI threshold for subsequent transmissions that meet the CQI requirements of a certain predefined percentage of the mobile stations. According to a second technique, the offset values are partially related to the number of mobile stations desiring the MBMS service and other parameters obtained in the beginning of the service transmission. For example, the offset values, $\Delta_{01}$ and $\Delta_{00}$, can be configured in a way that an estimated percentage of mobile stations' CQI values fall into the CQI threshold range.

Although some particular examples of control techniques are described herein, other techniques can be used to report CQI feedback information to the base station based on a comparison of the mobile station-specific CQIs to a CQI threshold range.

Figure 4:
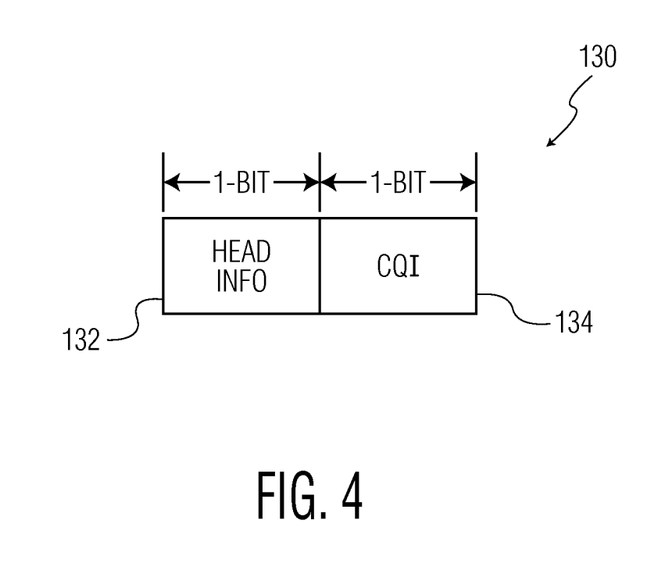
FIG. 4 illustrates a channel quality feedback information block that communicates a reduced set of CQI feedback information.

In an embodiment, the CQI feedback information is sent in a 2-bit format. For example, a first bit indicates whether the CQI feedback information is relative CQI information or full CQI feedback information. If the CQI feedback information is relative CQI information, then the second bit indicates whether the mobile station-specific CQI is greater than or less than the CQI threshold. FIG. 4 depicts a 2-bit channel quality feedback information block 130 in which the first bit 132 indicates whether the CQI feedback information is relative CQI information or full CQI feedback information and the second bit 134 indicates whether the mobile station-specific CQI is greater than or less than the CQI threshold.

Figure 5:
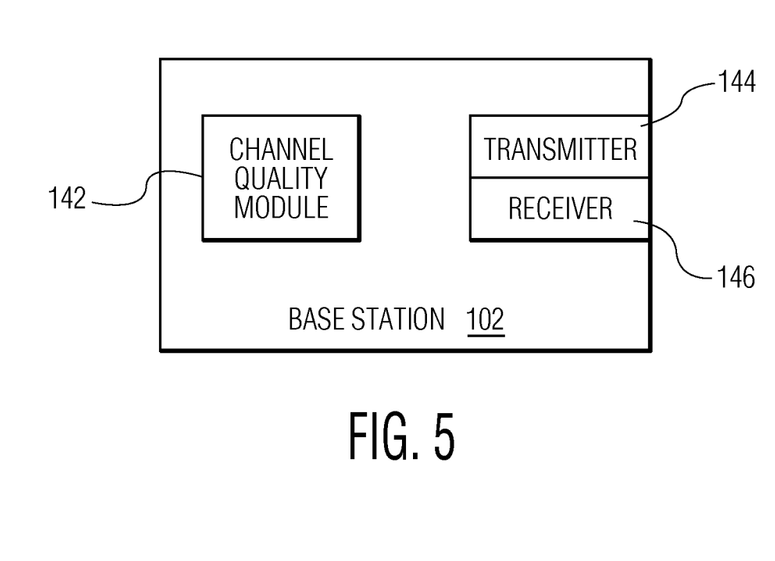
FIG. 5 depicts a functional block diagram of a base station.

FIG. 5 depicts a functional block diagram of a base station 102 that is configured to support the above-described feedback management technique. The base station includes a channel quality module 142, a transmitter 144, and a receiver 146. In the embodiment of FIG. 5, the channel quality module is configured to establish the CQI threshold range and to update the CQI threshold range in response CQI feedback information received from the mobile stations. The transmitter is configured to transmit the CQI threshold range to the mobile stations.

Figure 6:
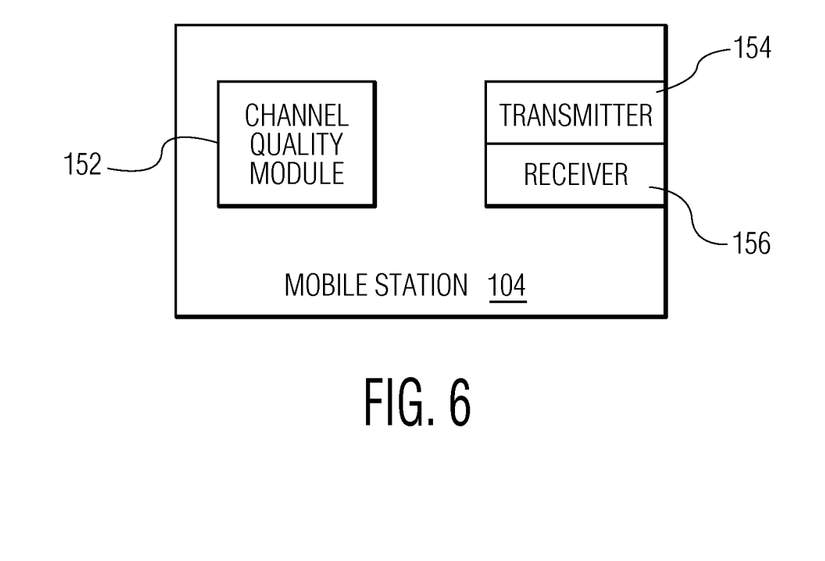
FIG. 6 depicts a functional block diagram of a mobile station.

FIG. 6 depicts a functional block diagram of a mobile station 104 that is configured to support the above-described feedback management technique. The mobile station includes a channel quality module 152, a transmitter 154, and a receiver 156. In the embodiment of FIG. 6, the channel quality module is configured to generate a mobile station-specific CQI and to generate CQI feedback information in response to a comparison between the mobile station-specific CQI and a CQI threshold range that is received from the base station. The transmitter is configured to transmit the CQI feedback information to the base station.

Figure 7:
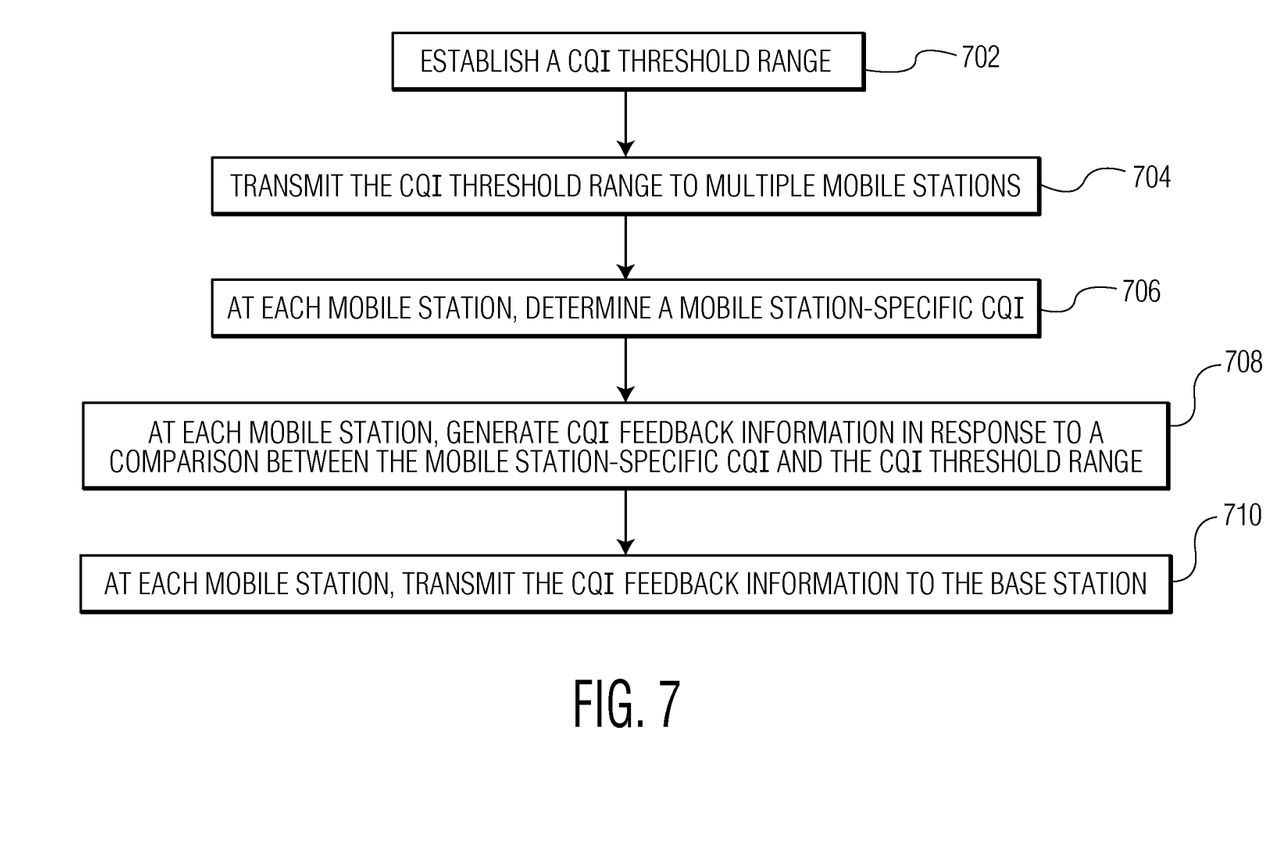
FIG. 7 is a process flow diagram of a method for managing uplink feedback in an MBMS wireless communications system.

FIG. 7 is a process flow diagram of a method for managing uplink feedback in an MBMS wireless communications system. At block 702, a CQI threshold range is established. At block 704, the CQI threshold range is transmitted to multiple mobile stations. At block 706, at each mobile station, a mobile station-specific CQI is determined. At block 708, at each mobile station, CQI feedback information is generated in response to a comparison between the mobile station-specific CQI and the CQI threshold range. At block 710, at each mobile station, the CQI feedback information is transmitted to the base station. As used herein, the term "broadcast" includes both broadcast and multicast technologies. Although CQIs are described as one form of channel quality information, other forms of channel quality information can be used in managing CQI feedback information. The techniques for managing channel quality feedback are applicable to any type of wireless communications system that supports MBMS.

Although specific embodiments of the invention have been described and illustrated, the invention is not to be limited to the specific forms or arrangements of parts as described and illustrated herein. The invention is limited only by the claims.

What is claimed is:

1. A method for managing uplink feedback in a multimedia broadcast/multicast services (MBMS) wireless communications system that includes a base station and a plurality of mobile stations, the method comprising:
   establishing a common channel quality indicator (CQI) threshold range having an upper boundary and a lower boundary;
   transmitting the CQI threshold range to the plurality of mobile stations;
   at each mobile station:
      determining a mobile station-specific CQI;
      generating CQI feedback information in response to a comparison between the mobile station-specific CQI and the CQI threshold range; and
      transmitting the CQI feedback information to the base station.

2. The method of claim 1, further comprising, at the base station:
   updating the CQI threshold range in response to the CQI feedback information that is transmitted from the mobile stations.

3. The method of claim 2, wherein updating the CQI threshold range comprises changing at least one of a CQI threshold, the upper boundary of the CQI threshold range, and the lower boundary of the CQI threshold range.

4. The method of claim 1, wherein the CQI threshold range is defined in terms of a CQI threshold and wherein generating the CQI feedback information at the mobile stations comprises generating an indication of the magnitude of the mobile station-specific CQI relative to the CQI threshold.

5. The method of claim 1, wherein the CQI threshold range is defined in terms of a CQI threshold and wherein generating the CQI feedback information at the mobile stations comprises generating an indication that the mobile station-specific CQI has crossed the CQI threshold.

6. The method of claim 5, wherein the CQI information is transmitted in response to the CQI threshold being crossed.

7. The method of claim 1, wherein generating the CQI feedback information at the mobile stations comprises generating a full set of CQI feedback information when the magnitude of the mobile station-specific CQI is below the lower boundary of the CQI threshold range.

8. The method of claim 1, wherein generating the CQI feedback information at the mobile stations comprises generating a full set of CQI feedback information only when a mobile station-specific CQI falls within a specified range of the lower boundary of the CQI threshold range.

9. The method of claim 8, wherein a full set of CQI feedback information is generated in response to a probability factor that controls the number of mobile stations that generate a full set of CQI feedback information.

10. The method of claim 1, wherein generating the CQI feedback information at the mobile stations comprises generating a full set of CQI feedback information when the magnitude of the mobile station-specific CQI is above the upper boundary of the CQI threshold range and the mobile station has generated a negative acknowledgement (NACK).

11. A system for managing uplink feedback in a multimedia broadcast/multicast services (MBMS) wireless communications system that includes a base station and a plurality of mobile stations, the system comprising:
   a channel quality module for establishing a channel quality indicator (CQI) threshold range having an upper boundary and a lower boundary;
   a transmitter for transmitting the CQI threshold range to the plurality of mobile stations; and
   wherein the channel quality module is further configured to update the CQI threshold range in response to CQI feedback information received from the mobile stations.

12. The system of claim 11, wherein updating the CQI threshold range comprises changing a CQI threshold.

13. The system of claim 11, wherein the CQI threshold range is defined in terms of a CQI threshold and wherein the CQI feedback information received from the mobile stations comprises an indication of the magnitude of mobile station-specific CQIs relative to the CQI threshold.

14. The system of claim 11, wherein the CQI threshold range is defined in terms of a CQI threshold and wherein the CQI feedback information received from the mobile stations comprises an indication that a mobile station-specific CQI has crossed the CQI threshold.

15. A system for managing uplink feedback in a multimedia broadcast/multicast services (MBMS) wireless communications system that includes a base station and a plurality of mobile stations, the system comprising:
   a channel quality module for:
      generating a mobile station-specific channel quality indicator (CQI);
      generating CQI feedback information in response to a comparison between the mobile station-specific CQI and a CQI threshold range having an upper boundary and a lower boundary that is received from the base station; and
   a transmitter for transmitting the CQI feedback information to the base station.

16. The system of claim 15, wherein the CQI threshold range is defined in terms of a CQI threshold and wherein generating the CQI feedback information at the mobile stations comprises generating an indication of the magnitude of the mobile station-specific CQI relative to the CQI threshold.

17. The system of claim 15, wherein the CQI threshold range is defined in terms of a CQI threshold and wherein generating the CQI feedback information at the mobile stations comprises generating an indication that the mobile station-specific CQI has crossed the CQI threshold.

18. The system of claim 17, wherein the CQI information is transmitted from the mobile station in response to the CQI threshold being crossed.

19. The system of claim 15, wherein the channel quality module generates a full set of CQI feedback information when the magnitude of the mobile station-specific CQI is below the lower boundary of the CQI threshold range.

20. The system of claim 15, wherein the channel quality module generates a full set of CQI feedback information when the magnitude of the mobile station-specific CQI is above the upper boundary of the CQI threshold range and the mobile station has generated a negative acknowledgement (NACK).

\* \* \* \* \*